United States Patent [19]

Nagai et al.

[11] Patent Number: 4,802,159

[45] Date of Patent: Jan. 31, 1989

[54] INFORMATION RECORDING DISC AND INFORMATION SIGNAL RECORDING APPARATUS THEREFOR

[75] Inventors: Tadao Nagai, Sagamiko; Hirohisa Yamaguchi, Tokyo; Akira Mashimo, Tokorozawa, all of Japan

[73] Assignee: Teac Corporation, Musashino, Japan

[21] Appl. No.: 917,188

[22] Filed: Oct. 9, 1986

[30] Foreign Application Priority Data

Oct. 16, 1985 [JP]  Japan .............................. 60-230609

[51] Int. Cl.⁴ .................. G11B 7/013; H04N 9/89; H04N 5/84
[52] U.S. Cl. .................................. 369/275; 309/44; 309/47; 358/342; 358/326
[58] Field of Search .................. 358/342, 323, 326; 369/272, 275, 47, 48, 49, 44; 346/137

[56] References Cited

U.S. PATENT DOCUMENTS

| | | | |
|---|---|---|---|
| 4,296,491 | 10/1981 | Jerome | 358/342 X |
| 4,426,693 | 1/1984 | Satoh et al. | 369/45 |
| 4,638,376 | 1/1987 | Sugiyama et al. | 358/342 |

*Primary Examiner*—W. B. Perkey
*Attorney, Agent, or Firm*—Ladas & Parry

[57] ABSTRACT

An information recording disc has a control signal such as an address signal pre-recorded on a guide track which is pre-formed on the information recording disc at a position different from a track position where an information signal is to be recorded. An information signal recording apparatus for recording the information signal on such an information recording disc controls a rotation frequency of the information recording disc to a constant rotation frequency by locking a horizontal synchronizing signal within a composite video signal to edges of pulses reproduced from the guide track, and the information signal is recorded on the information recording disc so that a recording interval of the control signal is positioned within a vertical blanking period of the information signal at least including the composite video signal.

6 Claims, 7 Drawing Sheets

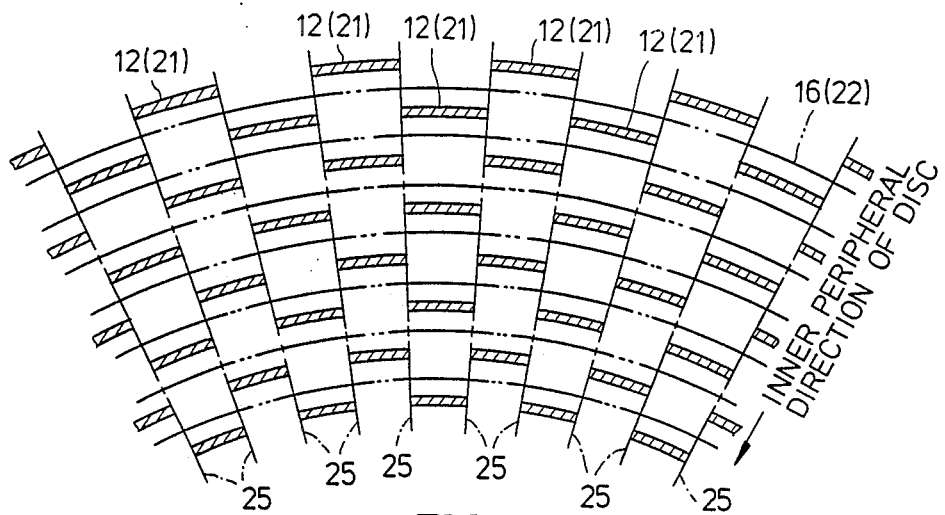
FIG. 3
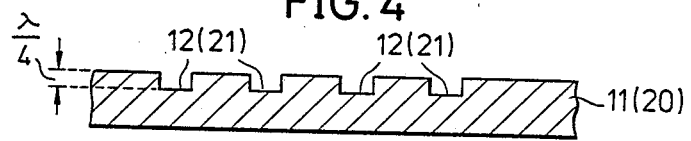
FIG. 4
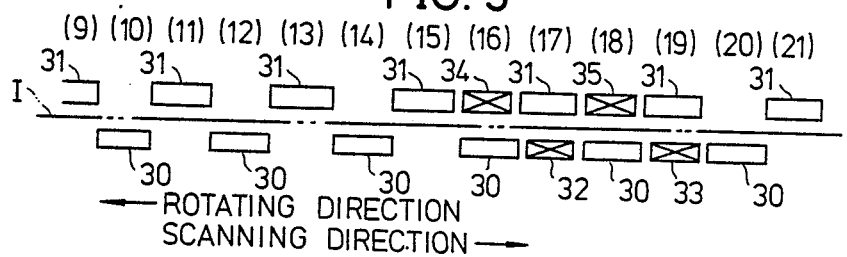
FIG. 5
FIG. 6
| X6 | X5 | X4 | X3 | X2 | X1 | X0 |
|----|----|----|----|----|----|----|
| | | | 28 BITS | | | |

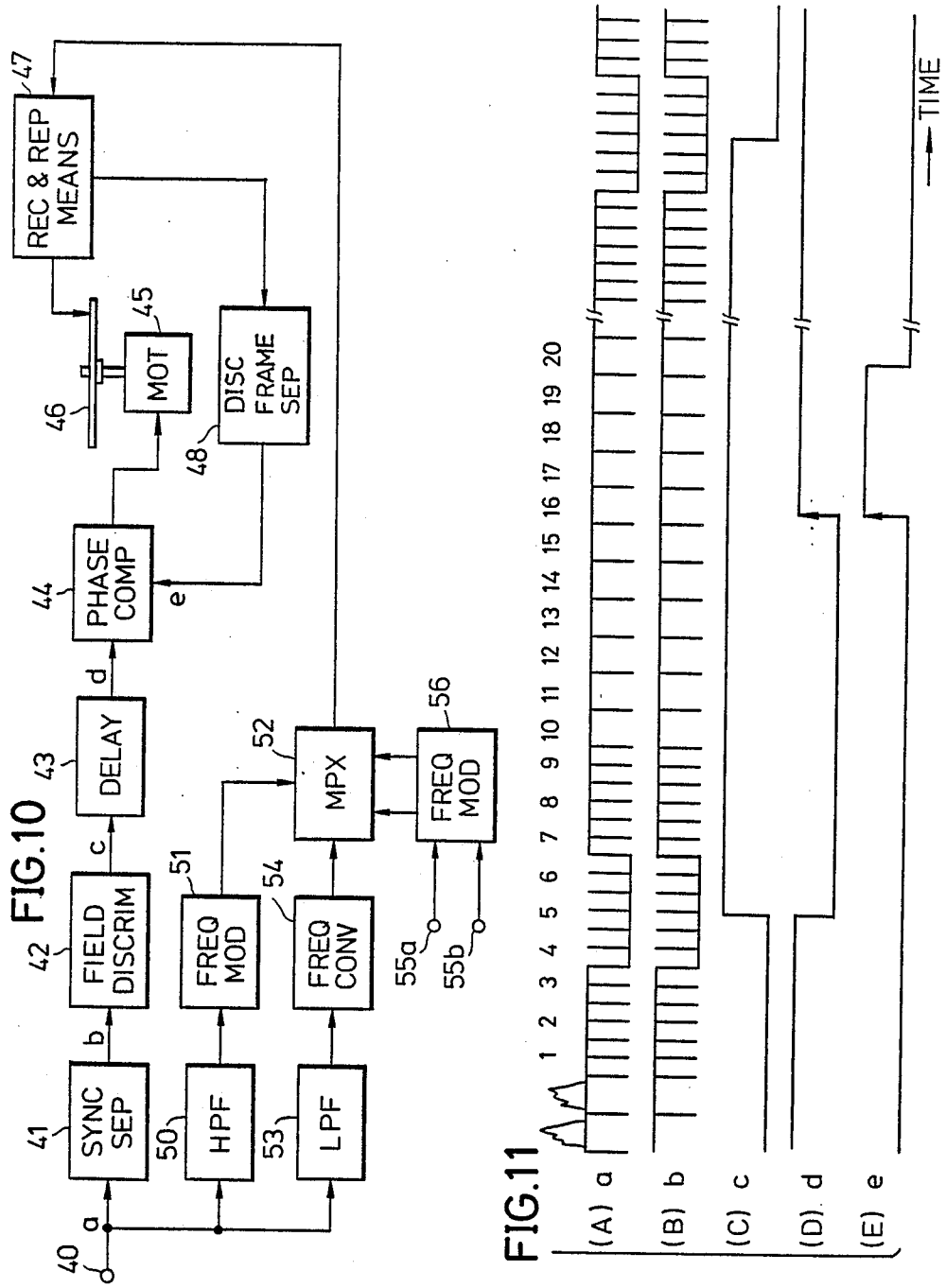

INFORMATION RECORDING DISC AND INFORMATION SIGNAL RECORDING APPARATUS THEREFOR

BACKGROUND OF THE INVENTION

The present invention generally relates to information recording discs and information signal recording apparatuses for recording information signals on the information recording discs, and more particularly to an information recording disc having pre-formed thereon a guide track for use when recording and reproducing an information signal on and from an information signal recording track which is formed at a predetermined position on the information recording disc, and an information signal recording apparatus for recording an information signal on such an information recording disc.

There is a conventional information recording disc (hereinafter simply referred to as a disc) having a guide groove pre-formed thereon before an information signal is recorded thereon, and such a disc is pre-recorded with an address signal on the guide groove. I is possible to easily detect a track position on the disc by reproducing the address signal.

However, the conventional disc is designed to record on the guide groove thereof also an information signal in addition to the address signal. For this reason, a main beam which scans the guide groove on the disc to reproduce the information signal during a reproducing mode also picks up the address signal. Even when the address signal is recorded within a blanking period of the information signal, there is a problem in that an audio signal within a reproduced information signal is modulated by the address signal and a noise component is accordingly mixed into a reproduced audio signal.

SUMMARY OF THE INVENTION

Accordingly, it is a general object of the present invention to provide a novel and useful information recording disc and an information signal recording apparatus therefor in which the problems described heretofore are eliminated.

Another and more specific object of the present invention is to provide an information recording disc having a control signal such as an address signal pre-recorded on a guide track which is pre-formed on the information recording disc independently of an information signal recording track, and an information signal recording apparatus for recording an information signal on such an information recording disc. According to the information recording disc and the information signal recording apparatus of the present invention, it is possible to accurately control the track position, set the disc sensitivity or the laser power depending on a radial position on the disc and the like for every one revolution period (for example, one frame) of the disc, because the control signal is pre-recorded on the disc. In addition, in the case where an address signal is pre-recorded on the disc as the control signal, it is possible to discontinue the recording of the information signal at an intermediate position on a recording surface of the disc and then continue the recording of a new information signal after a predetermined time has elapsed from the discontinuance, and also leave unrecorded (blank) track turns of the information signal recording track on the disc when recording the information signal during a first recording operation and record a different information signal on the unrecorded track turns of the information signal recording track during a second recording operation. In other words, it is possible to record information on the disc in a variety of methods and accordingly widen the application range of the disc.

Still another object of the present invention is to provide an information recording disc which comprises a spiral guide track or concentric guide tracks pre-formed thereon at a position different from a track position where an information signal is to be recorded, and a control signal is pre-recorded on the guide track. The control signal has a recording frequency band different from that of the information signal which is to be recorded, or the control signal is recorded in a recording interval having a different time position from a recording interval of the information signal which is to be recorded. According to the information recording disc of the present invention, it is possible to constantly detect the track position and the like during a recording mode in which the information signal is recorded, since the control signal is pre-recorded on the guide track in such a frequency band or recording interval that each information in the information signal which is to be recorded is unaffected by the control signal.

A further object of the present invention is to provide an information signal recording apparatus for recording an information signal on the information recording disc described above, in which a rotation frequency of the information recording disc is controlled to a constant rotation frequency by locking a horizontal synchronizing signal within a composite video signal to edges of pulses reproduced from the guide track, and the information signal is recorded on the information recording disc so that the recording interval of the control signal is positioned within a vertical blanking period of the information signal at least including the composite video signal. According to the information signal recording apparatus of the present invention, it is possible to discriminate only the control signal from signals reproduced from the information recording disc because the recording interval of the control signal is positioned within the vertical blanking period even when a recording frequency band of the control signal and a recording frequency band of a color burst signal or a frequency converted carrier chrominance signal within the information signal overlap each other.

Other objects and further features of the present invention will be apparent from the following detailed description when read in conjunction with the accompanying drawings.

BRIEF DESCRIPTION OF THE DRAWINGS

FIG. 3 is a plan view on an enlarged scale showing an essential part of the discs shown in FIGS. 1 and 2;

FIG. 4 is a cross sectional view showing an essential part of the discs shown in FIGS. 1 and 2;

FIG. 5 shows an essential part of a track pattern formed on the information recording disc according to the present invention;

FIG. 6 shows an embodiment of a signal format of an address signal which is pre-recorded on the information recording disc;

FIG. 10 is a system block diagram showing an embodiment of an essential part of the information signal recording apparatus according to the present invention;

FIGS. 11(A) through 11(E) show signal waveforms for explaining the operation of the block system shown in FIG. 10;

DETAILED DESCRIPTION

First, description will be given with respect to an embodiment of the information recording disc according to the present invention. The present embodiment will be described for the case where the present invention is applied to a disc previously proposed in a U.S. patent application Ser. No. 873,407 filed June 12, 1986 in which the assignee is the same as the assignee of the present application. Hence, description will be given on the previously proposed disc by referring to FIGS. 1 through 4.

Figure 1:
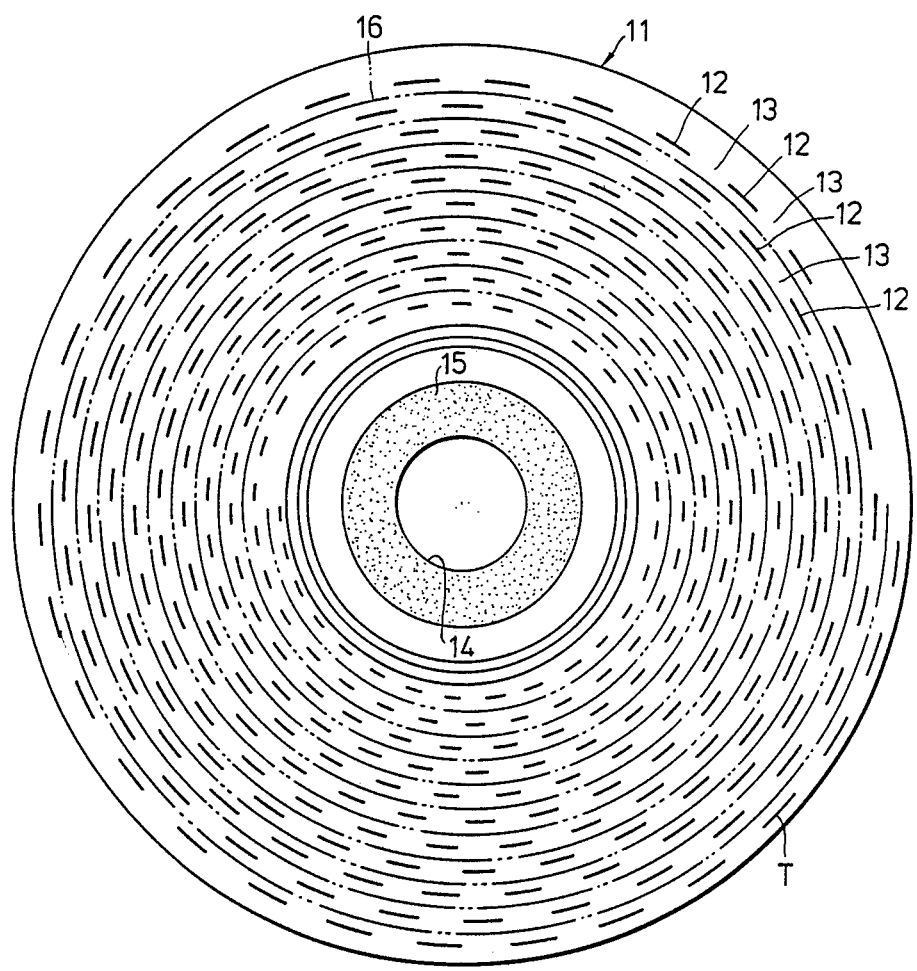
FIG. 1 shows an example of a track pattern formed on a disc to which the present invention may be applied.

FIG. 1 shows an information recording disc 11 having a diameter of 30 cm, for example, and a spiral guide track T is formed on a recording surface with a constant track pitch (for example, 1.6 microns) when the disc 11 is produced. The guide track T is made up of a plurality of consecutive guide track turns, and each guide track turn is constituted by an intermittent row of pits. In other words, a pre-formed pit 12 and a non-pit portion 13 are alternately formed repeatedly in each guide track turn. The pre-formed pits 12 are initially formed on the disc 11 before an information signal is first recorded thereon. That is, the pre-formed pits 12 are pre-formed on the disc 11 before the actual recording of the information signal. In the present specification, these pre-formed pits 12 will simply be referred to as pits 12.

The length of each pit 12 of the guide track T is selected to a value which is equal to a recording length of one horizontal scanning period (1H) of a video signal recorded on a constant angular velocity (CAV) system disc, for example. In addition, when a recording surface of the disc 11 is divided into a plurality of imaginary equiangular sectoral regions, the pit 12 is formed in only one of two consecutive guide track turns of the guide track T in each equiangular sectoral region so that the pits 12 are formed in every other guide track turns in a radial direction of the disc 11 in each equiangular sectoral region. Concretely speaking, the pits 12 will naturally be formed in this manner when the recording surface of the disc 11 is divided into an odd number of equiangular sectoral regions and the pits 12 are formed in every other equiangular sectoral regions in each guide track turn. For example, when the recording surface of the disc 11 is divided into 525 equiangular sectoral regions, one of two consecutive guide track turns comprises 262 pits 12 while the other of the two consecutive guide track turns comprises 263 pits 12.

A center hole 14 is formed at a center of the disc 11, and a label portion 15 is formed on the periphery of the center hole 14. As will be described later on in the present specification, an information signal including the video signal is recorded on and reproduced from an information signal recording track formed in a region between two consecutive guide track turns of the guide track T, by use of a main light beam. In FIG. 1, a center line of the information signal recording track is indicated by a two-dot chain line 16.

Figure 2:
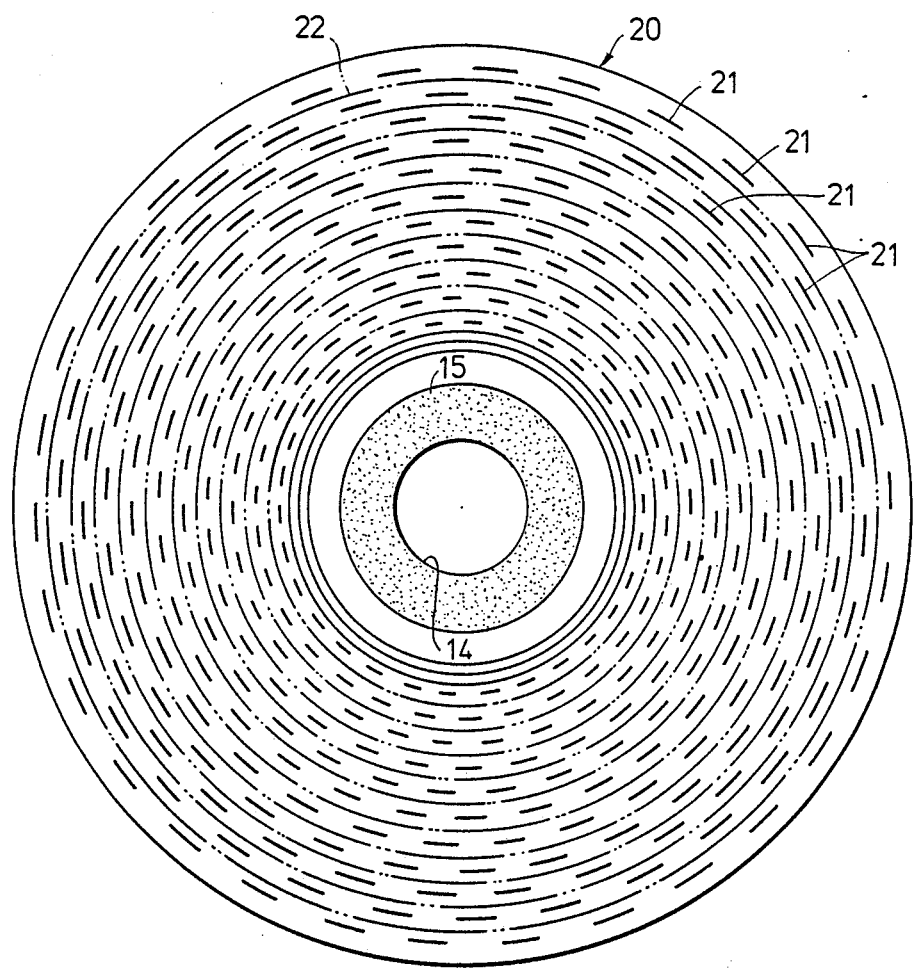
FIG. 2 shows another example of a track pattern formed a disc to which the present invention may be applied.

FIG. 2 shows another track pattern formed on the previously proposed disc. In FIG. 2, those parts which are the same as those corresponding parts in FIG. 1 are designated by the same reference numerals, and description thereof will be omitted. In FIG. 2, a plurality of concentric guide tracks are formed on a disc 20. In the present specification, these concentric guide tracks will also be referred to as a plurality of consecutive guide track turns making up the guide track. Pits 21 are intermittently formed on each of the concentric guide tracks. When a recording surface of the disc 20 is divided into a plurality of equiangular sectoral regions, the pit 21 is formed in only one of two mutually adjacent concentric guide tracks in each equiangular sectoral region so that the pits 21 are formed in every other concentric guide tracks in a radial direction of the disc 20 in each equiangular sectoral region. Concretely speaking, the pits 21 will naturally be formed in this manner when the recording surface of the disc 20 is divided into an even number of equiangular sectoral regions and the pits 21 are formed in every other equiangular sectoral regions in each concentric guide track, that is, in each guide track turn.

The information signal is recorded on and reproduced from an information signal recording track formed in a region between two mutually adjacent concentric guide tracks, by use of the main light beam. In FIG. 2, a center line of the information signal recording track is indicated by a two-dot chain line 22. According to the disc 20, a plurality of concentric information signal recording tracks are formed because the guide track is made up of the plurality of concentric tracks. In the present specification, these concentric information signal recording tracks will also be referred to as a plurality of consecutive information recording track turns making up the information signal recording track.

The discs 11 and 20 only differ in that the guide track of the disc 11 is made up of a spiral guide track and the guide track of the disc 20 is made up of a plurality of concentric guide tracks, and the configuration and recording arrangement of the pits 12 and 21 are the same. In other words, as shown on an enlarged scale in FIG. 3 which shows a part of the track pattern of the disc 11 (20), the start and end of each pit 12 (21) indicated by hatchings in one equiangular sectoral region respectively coincide with the end of the pit 12 (21) in one adjacent equiangular sectoral region and the start of the pit 12 (21) in another adjacent equiangular sectoral region. Boundary lines 25 indicated by one-dot chain lines connect the starts and ends of the pits 12 (21) in the radial direction of the disc 11 (20), and these boundary lines 25 define the equiangular sectoral regions.

FIG. 4 shows the cross sectional configuration of the disc 11 (20). As shown in FIG. 4, a depth of the pit 12 (21) is selected to ¼ the wavelength λ of the main and sub light beams. Hence, a phase error λ/2 is introduced between the light reflected within the groove of the pit 12 (21) and the light reflected at a position other than the groove, and the light intensity is greatly attenuated in the case of the light reflected at the position other than the groove.

According to the previously proposed disc, it is possible to obtain a tracking error signal from signals reproduced from the guide track by the main light beam because the disc comprises a recording surface which is divided into a plurality of equiangular sectoral regions and a guide track formed on the recording surface, where each track turn of the guide track is constituted by a row of intermittent pits formed in every other equiangular sectoral regions, and the pit is only formed in one of two mutually adjacent track turns of the guide track in each equiangular sectoral region so that the pits are formed in every other track turns in a radial direction of the disc in each equiangular sectoral region. Hence, although the conventional disc having two continuous spiral guide tracks (grooves) located on both sides of an information signal recording track suffers a problem in that a trailing sub light beam is affected by the pits of the information signal recorded by a main light beam, it is possible to eliminate such a problem according to the previously proposed disc. Furthermore, it is possible to prevent diffraction in a reflected light beam from the guide track since the guide track has a depth of ¼ the wavelength of the main light beams for recording and reproducing the information signal. For this reason, the tracking error signal will not be affected by diffracted light even when the main light beam traverses the guide track. As a result, the astigmatic focusing method can be used as a method of detecting a focal error, and the construction of an optical system in a recording and reproducing apparatus can be simplified compared to that of the conventional recording and reproducing apparatus which is designed to play the conventional disc having a single continuous spiral guide track which is recorded with the information signal.

Next, description will be given with respect to the embodiment of the information recording disc according to the present invention. In FIG. 5, a two-dot chain line I indicates a center line of an information signal recording track formed on a CAV system disc which is to be rotated at a constant angular velocity, and corresponds to the two-dot chain lines 16 and 22 shown in FIGS. 1 and 2, respectively. Pre-formed pits 30 of a track turn of the guide track are formed for every other 1H on the lower side of the two-dot chain line I (that is, inner peripheral side of the disc), and pre-formed pits 31 of a track turn of the guide track are formed for every other 1H on the upper side of the two-dot chain line I (that is, outer peripheral side of the disc). As in the case of the previously proposed disc described before, the disc comprises a recording surface which is divided into a plurality of equiangular sectoral regions and a guide track formed on the recording surface, where each track turn of the guide track is constituted by a row of intermittent pits 30 (or 31) formed in every other equiangular sectoral regions, and the pit 30 (or 31) is only formed in one of two mutually adjacent track turns of the guide track in each equiangular sectoral region so that the pits 30 (or 31) are formed in every other track turns in a radial direction of the disc in each equiangular sectoral region.

In FIG. 5, portions 32 through 35 indicated with an "X" mark indicate recording portions where an address signal is pre-recorded as an example of a control signal. In the track turn of the guide track on the inner peripheral side of the disc, the recording portions 32 and 33 are respectively arranged between two pits 30. Similarly, in the track turn of the guide track on the outer peripheral side of the disc, the recording portions 34 and 35 are respectively arranged between two pits 31. In other words, address signals containing identical address information are pre-recorded at two positions in each track turn of the guide track when the disc is produced, so as to enable an address error checking. The address signals recorded in the recording portions 32 through 35 are respectively constituted by digital data having a signal format shown in FIG. 6. The address signal is modulated according to a predetermined modulation system such as the phase encoding (hereinafter simply referred to as PE) before being recorded on the disc.

In FIG. 6, one address signal is constituted by seven words $X_6$ through $X_0$, and the words $X_6$ through $X_0$ are recorded and reproduced in the sequence of the words $X_6 \rightarrow X_5 \rightarrow \ldots \rightarrow X_1 \rightarrow X_0$. One word comprises four bits, and the address signal as a whole therefore comprises twenty-eight bits. The word $X_6$ comprises start bits indicating a value "F" in hexadecimal (that is, a value "1111" in decimal), for example, and the word $X_5$ comprises disc information bits. The words $X_4$ through $X_0$ comprise track address bits containing the track address. The track address bits indicate the number of track turns from an innermost peripheral position on the disc when it is assumed that one track turn is counted for each revolution of the disc. The words $X_4$, $X_3$, $X_2$, $X_1$ and $X_0$ indicate the values in the ten thousands digit, thousands digit, hundreds digit, tens digit and ones digit, respectively. Accordingly, a maximum of 99,999 track turns may be described by the words $X_4$ through $X_0$.

Figure 7:
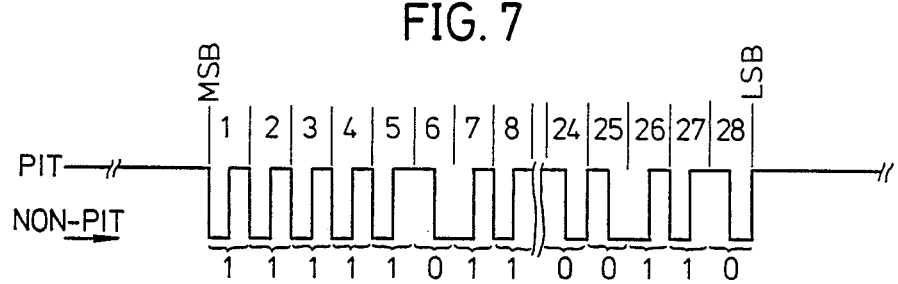
FIG. 7 shows an example of a signal waveform of the address signal.

FIG. 7 shows an example of the signal waveform of one address signal. Upper four bits including a most significant bit (MSB) corresponds to the word $X_6$, and in FIG. 7, the values of data are shown below the signal waveform. In FIG. 5, the address signals are reproduced from the recording portions 32 through 35 in the sequence of the recording portions $34 \rightarrow 32 \rightarrow 35 \rightarrow 33$. The address signals reproduced from the recording portions 34 and 35 are discriminated as address signals reproduced from an odd numbered track turn of the guide track and the address signals reproduced from the recording portions 32 and 33 are discriminated as address signals reproduced from an even numbered track turn of the guide track, because the values of the address signals are preset so that it is possible to discriminate the address signals reproduced from the odd and even numbered track turns of the guide track.

For example, an information signal comprising a color video signal and two channels of audio signals are recorded on and reproduced from track turns of the information signal recording track. The color video signal is separated into a luminance signal and a carrier chrominance signal, and the separated luminance signal is frequency-modulated into a frequency modulated (FM) luminance signal having a carrier deviation band of 5.6 MHz to 7.0 MHz, for example, as indicated by a solid line II in FIG. 8. The separated carrier chrominance signal is frequency-converted into a frequency band lower than the frequency band of the FM luminance signal and is converted into a frequency converted carrier chrominance signal having a carrier frequency of approximately 743 kHz as indicated by a solid line III. The two channels of audio signals are independently frequency-modulated into FM audio signals having carrier frequencies of 1.5 MHz and 1.8 MHz, respectively, as indicated by solid lines IV and V. The FM luminance signal, the frequency converted carrier chrominance signal and the FM audio signals are frequency-division-multiplexed into a frequency division multiplexed signal, and the frequency division multiplexed signal is recorded on the track turns of the information signal recording track.

On the other hand, the address signal is modulated according to the PE, for example, before being recorded on the disc. For example, a maximum frequency of the modulated address signal is approximately 818 kHz which is fifty-two times the horizontal scanning frequency, and a minimum frequency of the modulated address signal is approximately 409 kHz which is twenty-six times the horizontal scanning frequency. In other words, the modulated address signal has a frequency spectrum indicated by a phantom line VI in FIG. 8. In order to minimize the undesirable effects of the modulated address signal on the FM audio signals, the maximum and minimum frequencies of the modulated address signal are selected so that a valley portion of the frequency spectrum VI is located at the carrier frequencies of the FM audio signals.

Figure 8:
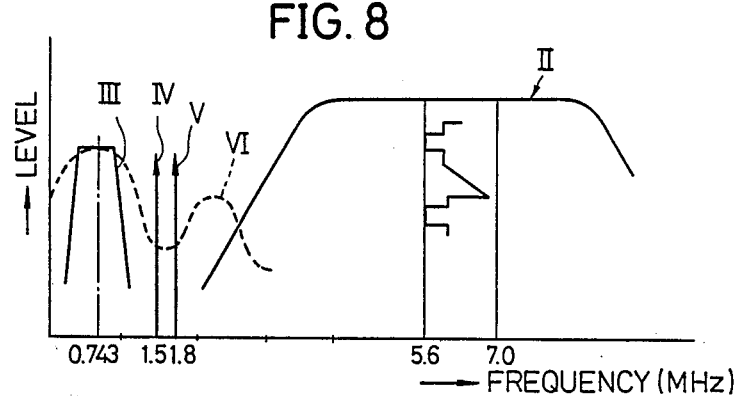
FIG. 8 show frequency spectrums of an information signal which is to be recorded on the information recording disc and the address signal pre-recorded on the information recording disc.

As a result, the frequency spectrum VI of the modulated address signal overlaps the frequency band III of the frequency converted carrier chrominance signal as shown in FIG. 8, and the frequency converted carrier chrominance signal and the modulated address signal cannot be recorded simultaneously. For this reason, it is necessary to record the frequency converted carrier chrominance signal and the modulated signal at mutually different positions on the time base. As is well known, he frequency converted carrier chrominance signal including the color burst signal is not transmitted during the horizontal blanking period excluding the back porch nor during a specific time period within the vertical blanking period. Hence, in the disc according to the present invention, the recording portions 32 through 35 are pre-formed at the time of the production of the disc so that each recording portion is located at a specific position within the vertical blanking period avoiding the time period of the color burst signal.

Figure 9:
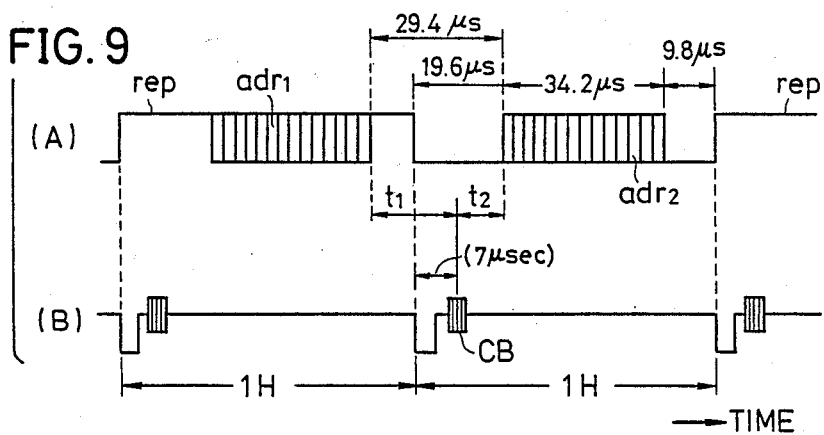
FIGS. 9(A) and 9(B) show signal waveforms for explaining the relationship between a reproduced address signal and a signal which is to be recorded on the information recording disc.

When recording on the disc the frequency division multiplexed signal of the FM luminance signal, the frequency converted carrier chrominance signal and the FM audio signals, a jitter occurs due to the eccentricity and the like of the disc. As will be described later on in the present specification, the rotation of the disc is controlled during the recording and reproduction of the information signal (frequency division multiplexed signal) so that edges of pulses reproduced from the pits 30 and 31 become locked to the horizontal synchronizing signal within the information signal. In this case, the phase of the color burst signal with respect to the address signal becomes relatively advanced or retarded due to the jitter. For this reason, the recording interval and the recording position of the address signal (modulated address signal) are selected so that the color burst signal CB within the vertical blanking period shown in FIG. 9(B) becomes positioned approximately at the center portion of a time interval t1+t2 between mutually adjacent address signals adr1 and adr2 within the reproduced pulses rep shown in FIG. 9(A) reproduced from the pits of the guide track on the disc. In other words, the recording interval of the address signal is selected so that the color burst signal CB is positioned approximately at the center portion of the time interval t1+t2 in which the address signal is not reproduced, that is, the time interval t1+t2 from the terminal position of the recording interval of the address signal adr1 reproduced from one track turn of the guide track to the starting position of the recording interval of the address signal adr2 reproduced from the other track turn of the guide track out of the two track turns of the guide track on both sides of one track turn of the information signal recording track. As a result, the time interval t1+t2 is selected to 29.4 microseconds, and the address signal is pre-recorded on the guide track together with the pits for a time interval of approximately 34.2 microseconds from a position which is approximately 19.6 microseconds from the terminal end of one pit.

According to the disc of the present invention, it is possible to accurately control the track position, set the disc sensitivity or the laser power depending on a radial position on the disc and the like for every one revolution period (for example, one frame) of the disc, because the control signal is pre-recorded on the disc. In addition, in the case where the address signal is pre-recorded on the disc as the control signal, it is possible to discontinue the recording of the information signal at an intermediate position on the recording surface of the disc and then continue the recording of a new information signal after a predetermined time has elapsed from the discontinuance, and also leave unrecorded (blank) track turns of the information signal recording track on the disc when recording the information signal during a first recording operation and record a different information signal on the unrecorded track turns of the information signal recording track during a second recording operation. In other words, it is possible to record information on the disc in a variety of methods and accordingly widen the application range of the disc.

Next, description will be given with respect to an embodiment of the information signal recording apparatus according to the present invention. FIG. 10 shows the embodiment of the information signal recording apparatus, and a composite video signal which is to be recorded is applied to an input terminal 40. The signal waveform of the composite video signal in a vicinity of the vertical blanking period is indicated by a in FIG. 11(A). A synchronizing signal separating circuit 41 separates a composite synchronizing signal b shown in FIG. 11(B) from the composite video signal a. A frame separating circuit 42 discriminates whether the composite synchronizing signal b relates to a first (odd) field or a second (even) field, and produces a frame pulse signal c shown in FIG. 11(C) which rises within a vertical synchronizing pulse of the predetermined one of the first and second fields and falls within a vertical synchronizing pulse of the other one of the first and second fields.

Figure 12:
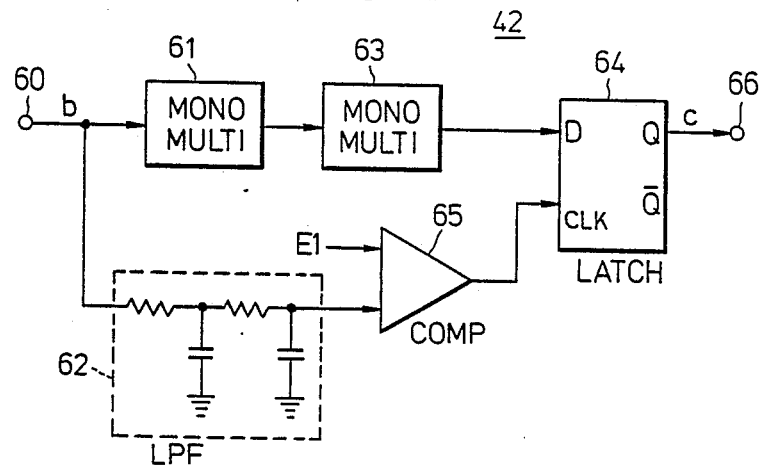
FIG. 12 is a circuit diagram showing an embodiment of a frame separating circuit within the block system shown in FIG. 10.
Figure 13:
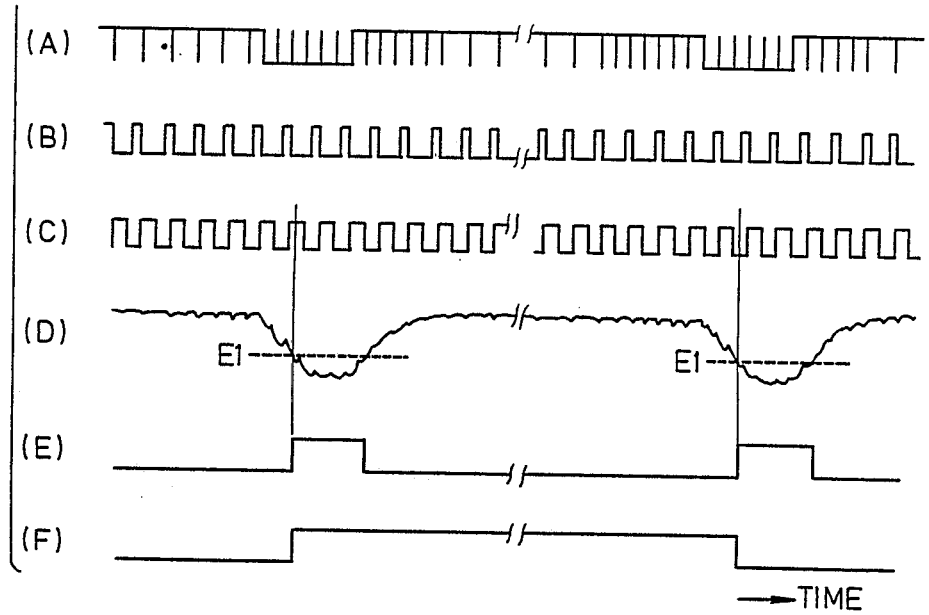
FIGS. 13(A) through 13(F) show signal waveforms for explaining the operation of the circuit shown in FIG. 12.

FIG. 12 shows an embodiment of the frame separating circuit 42. A composite synchronizing signal shown in FIG. 13(A) which is identical to the composite synchronizing signal b shown in FIG. 11(B) is applied to a terminal 60 and is supplied to a monostable multivibrator 61 and to a lowpass filter 62. The lowpass filter 62 comprises resistors R1 and R2 and capacitors C1 and C2 which are connected as shown. An output signal of the monostable multivibrator 61 shown in FIG. 13(B) is supplied to a monostable multivibrator 63 and is formed into a signal shown in FIG. 13(C). The output signal of the monostable multivibrator 63 is supplied to a data input terminal D of a latch circuit 64. An output signal of the lowpass filter 62 indicated by a solid line in FIG. 13(D) is compared with a reference level E1 indicated by a phantom line in a comparator 65. As a result, a signal shown in FIG. 13(E) is obtained from the comparator 65 and is supplied to a clock input terminal CLK of the latch circuit 64. Accordingly, a frame pulse signal shown in FIG. 13(F) which is identical to the frame pulse signal c shown in FIG. 11(C) is outputted from the latch circuit 64 and is supplied to a delay circuit 43 shown in FIG. 10 via a terminal 66.

The frame pulse signal c having a period of one frame is converted into a pulse signal d shown in FIG. 11(D) in the delay circuit 43 which is constituted by a monostable multivibrator, for example. The pulse signal d has a rising edge within the horizontal scanning period of the scanning line number "16", for example. This pulse signal d is supplied to a phase comparator 44.

On the other hand, recording portions on a disc 46 such as the recording portions 32 through 35 shown in FIG. 5 are scanned by a sub light beam of a known recording and reproducing means 47, for example, and reproduced control signals are supplied to a disc frame separating circuit 48. The information signal including the composite video signal is recorded by a main light beam at a rate of two fields per one revolution of the disc 46 at the position indicated by the two-dot chain line I (two-dot chain lines 16 and 22 shown in FIGS. 1 and 2) between the two mutually adjacent track turns on the guide track.

The composite video signal a from the input terminal 40 is supplied to a highpass filter 50 and to a lowpass filter 53. The highpass filter 50 separates a luminance signal within the composite video signal a, and a frequency modulator 51 frequency-modulates the separated luminance signal into a frequency modulated (FM) luminance signal. The FM luminance signal is supplied to a frequency division multiplexing circuit 52. On the other hand, the lowpass filter 53 separates a carrier chrominance signal within the composite video signal a, and a frequency converter 54 frequency-converts the separated carrier chrominance signal into a frequency band lower than a frequency band of the FM luminance signal. An output frequency converted carrier chrominance signal of the frequency converter 54 is supplied to the frequency division multiplexing circuit 52. Two channels of audio signals are applied to input terminals 55a and 55b, for example, and the audio signals are independently frequency-modulated into FM audio signals in a frequency modulator 56. The FM audio signals are supplied to the frequency division multiplexing circuit 52. The signals which have the frequency spectrums II through V shown in FIG. 8 and are supplied to the frequency division multiplexing circuit 52 are frequency-division-multiplexed into a frequency division multiplexed signal. The frequency division multiplexed signal is supplied to the recording and reproducing means 47 and is recorded on the disc 46 by a recording means of the recording and reproducing means 47 while reproducing the control signal (address signal) from the guide track on the disc 46 by a reproducing means of the recording and reproducing means 47.

The disc frame separating circuit 48 generates a pulse signal e shown in FIG. 11(E) which rises in synchronism with the edge of the address signal which is reproduced from the recording portion 34, that is, in synchronism with the edge of the address signal which is reproduced first out of the address signals recorded in the recording portions 32 through 35.

Figure 14:
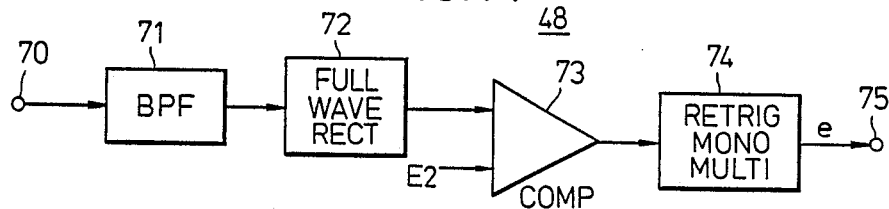
FIG. 14 is a circuit diagram showing an embodiment of a disc frame separating circuit within the block system shown in FIG. 10.
Figure 15:
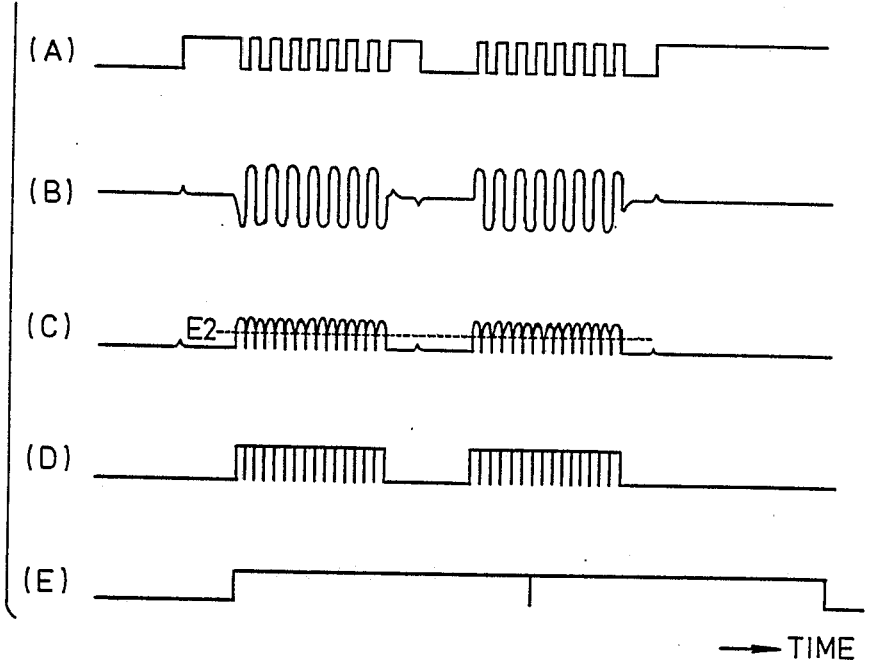
FIGS. 15(E) through 15(E) show signal waveforms for explaining the operation of circuit shown in FIG. 14.

FIG. 14 shows an embodiment of the disc frame separating circuit 48. A reproduced address signal shown in FIG. 15(A) is applied to a terminal 70 and is formed into a signal shown in FIG. 15(B) in a bandpass filter 71. The output signal of the bandpass filter 71 is formed into a signal indicated by a solid line in FIG. 15(C) in a full wave rectifying circuit 72, and the output signal of the full wave rectifying circuit 72 is compared with a reference level E2 indicated by a phantom line in FIG. 15(C) in a comparator 73. A signal shown in FIG. 15(D) is obtained from the comparator 73 and is supplied to a retriggerable monostable multivibrator 74. As a result, a pulse signal shown in FIG. 15(E) which is identical to the pulse signal e shown in FIG. 11(E) is obtained from the retriggerable monostable multivibrator 74 and is supplied to the phase comparator 44 shown in FIG. 10 via a terminal 75.

The phase of the pulse signal e is compared with the phase of the pulse signal d described before in the phase comparator 44. An output error voltage of the phase comparator 44 dependent on the phase error between the pulse signals d and e is supplied to a motor 45 via a predetermined driving circuit (not shown) so as to control the rotation of the motor 45.

The motor 45 rotates a turntable (not shown) on which the disc 46 is placed. Under a steady-state rotation, the motor 45 rotates at a speed of 1800 rpm in phase synchronism with the edges of the pits 30 and 31. The rotational phase of the motor 45 is controlled responsive to the phase error voltage of the phase comparator 44. Hence, the composite video signal is recorded on the disc 46 so that the horizontal scanning period of the scanning line number "16" within the vertical blanking period becomes positioned within the recording portion 34 in which the address signal is pre-recorded, as shown in FIG. 5. The numerals shown in brackets in FIG. 5 and the numerals shown above the signal waveform in FIG. 11(A) indicate the scanning line number of the composite video signal.

According to the information signal recording apparatus of the present invention, it is possible to discriminate only the control signal from the signals reproduced from the information recording disc because the recording interval of the control signal is positioned within the vertical blanking period even when a recording frequency band of the control signal and a recording frequency band of a color burst signal or a frequency converted carrier chrominance signal within the information signal overlap each other. In addition, it is possible to prevent the control signal from mixing into the reproduced picture as noise and also prevent the audio signals from mixing into the reproduced picture as noise, because the guide track is provided independently of the information signal recording track.

The present invention is not limited to the embodiments described heretofore, and the control signal (address signal) may be recorded within the pit of the guide track or recorded so as to partly overlap the pit. A control signal other than the address signal, such as a control signal for setting disc sensitivity or the laser power depending on the radial position on the disc, may be recorded on the disc. The guide track is not limited to the row of intermittent pits, and may take any form as long as the guide track is pre-formed on the disc at a position different from the track position where the information signal is to be recorded. In addition, the modulation system for the control signal (address signal) is not limited to the PE, and it is possible to employ other modulation systems which allow self-clock demodulation. Moreover, the information signal which is recorded on the disc is not limited to the information signal including the composite video signal.

Further, the present invention is not limited to these embodiments, but various variations and modifications may be made without departing from the scope of the present invention.

What is claimed is:

1. An information recording disc comprising:
   a recording surface, said recording surface being divided into a plurality of imaginary equiangular sectoral regions each of which is defined by two of a plurality of imaginary radial lines; and
   a guide track formed on said recording surface at a position different from a track position of an information signal which is to be recorded, said guide track comprising a spiral guide track or concentric guide tracks, each track turn of said guide track being constituted by a row of pits formed in every other of said equiangular sectoral regions, said pit being only formed in one of two mutually adjacent track turns of said guide track in each of said equiangular sectoral regions so that the pits are formed in every other track turn of said guide track in a radial direction of the information recording disc in each of said equiangular sectoral regions, each pit having two ends which respectively lie on two imaginary radial lines defining said each pit, said track position where said information signal is to be recorded being located in a region between said two mutually adjacent track turns of said guide track,
   said guide track being pre-recorded with a control signal having a frequency band different from a frequency band of said information signal which is to be recorded.

2. An information recording disc as claimed in claim 1 in which said control signal comprises an address signal for indicating a track position on said recording surface.

3. An information recording disc comprising:
   a recording surface, said recording surface being divided into a plurality of imaginary equiangular sectoral regions each of which is defined by two of a plurality of imaginary radial lines; and
   a guide track formed on said recording surface at a position different from a track position of an information signal which is to be recorded, said guide track comprising a spiral guide track or concentric guide tracks, each track turn of said guide track being constituted by a row of pits formed in every other of said equiangular sectoral regions, said pit being only formed in one of two mutually adjacent track turns of said guide track in each of said equiangular sectoral regions so that the pits are formed in every other track turn of said guide track in a radial direction of the information recording disc in each of said equiangular sectoral regions, each pit having two ends which respectively lie on two imaginary radial lines defining said each pit, said track position where said information signal is to be recorded being located in a region between said two mutually adjacent track turns of said guide track,
   said guide track being pre-recorded with a control signal in a recording interval having a different time position from a recording interval of said information signal which is to be recorded.

4. An information recording disc as claimed in claim 3, in which said control signal comprises an address signal for indicating a track position on said recording surface.

5. An information recording disc as claimed in claim 3 in which a first track turn out of said two mutually track turns of said guide track comprises a first recording portion in which said control signal is pre-recorded and a second track turn out of said two mutually adjacent tracks turns of said guide track comprises a second recording portion in which said control signal is pre-recorded, said first track turn being scanned before in time as compared to said second track turn, said first and second recording portions being provided at such positions that a recording position of a color burst signal of a composite video signal within said information signal which is to be recorded is located approximately at a center of an interval between a terminal position of said first recording portion and a starting position of said second recording portion.

6. An information recording disc as claimed in claim 5 in which said first and second recording portions are respectively provided at a plurality of locations in a corresponding one of said two mutually adjacent track turns of said guide track.

* * * * *